(12) United States Patent
Safar (10) Patent No.: US 12,441,235 B1
(45) Date of Patent: Oct. 14, 2025

(54) REAL-TIME TRAFFIC FLOW INDICATOR DEVICE WITH ADVANCED SENSORS AND V2V COMMUNICATION

(71) Applicant: Samir Hanna Safar, Solana Beach, CA (US)

(72) Inventor: Samir Hanna Safar, Solana Beach, CA (US)

(73) Assignee: Samir Hanna Safar

( * ) Notice: Subject to any disclaimer, the term of this patent is extended or adjusted under 35 U.S.C. 154(b) by 24 days.

(21) Appl. No.: 18/738,726

(22) Filed: Jun. 10, 2024

(51) Int. Cl.
| | |
|---|---|
| *B60Q 1/50* | (2006.01) |
| *B60Q 1/52* | (2006.01) |
| *B60Q 9/00* | (2006.01) |
| *G06V 10/44* | (2022.01) |
| *G06V 10/80* | (2022.01) |
| *G06V 10/82* | (2022.01) |
| *G06V 20/56* | (2022.01) |
| *H04W 4/46* | (2018.01) |
| *H04W 4/80* | (2018.01) |

(52) U.S. Cl.
CPC ............. *B60Q 1/5037* (2022.05); *B60Q 1/52* (2013.01); *B60Q 9/00* (2013.01); *G06V 10/44* (2022.01); *G06V 10/80* (2022.01); *G06V 10/82* (2022.01); *G06V 20/588* (2022.01); *H04W 4/46* (2018.02); *H04W 4/80* (2018.02); *B60Q 2400/20* (2013.01)

(58) Field of Classification Search
CPC .......... B60Q 1/5037; B60Q 1/52; B60Q 9/00; B60Q 2400/20; H04W 4/46; H04W 4/80; G06V 10/82; G06V 10/44; G06V 10/80; G06V 20/588
See application file for complete search history.

(56) References Cited

U.S. PATENT DOCUMENTS

| | | | | |
|---|---|---|---|---|
| 2016/0368416 A1* | 12/2016 | Nemitz | .................... | B60Q 1/52 |
| 2020/0042285 A1* | 2/2020 | Choi | ........................ | G10L 25/84 |
| 2022/0309806 A1* | 9/2022 | Zhou | ..................... | G06V 20/588 |
| 2024/0043040 A1* | 2/2024 | Liu | ................... | B60W 60/0015 |
| 2024/0416949 A1* | 12/2024 | Barrera | ................. | B60W 30/16 |

* cited by examiner

*Primary Examiner* — Omer S Khan
(74) *Attorney, Agent, or Firm* — Samir Hanna Safar (57) ABSTRACT

A Real-Time Traffic Flow Indicator device for vehicles, comprising an advanced sensor assembly with Time-of-Flight cameras, LIDAR, and FMCW radar to capture surrounding data, including lane markings, vehicle positions, speeds, and distances. Edge-based lane detection algorithms employing CNNs detect lane boundaries, while real-time traffic analysis algorithms utilizing sensor fusion assess traffic conditions. Color-coded light indicators on rear and front displays represent specific traffic scenarios, and a V2V communication module enables bidirectional transmission of lane-specific traffic information. An Intelligent Data Processing Algorithm processes integrated sensor and V2V data to assess traffic conditions, communicating assessments and hazards through an LCD interface and FPGA-powered safety alert subsystem. The device also detects emergency vehicles using machine vision, activating LED indicators to alert the driver.

19 Claims, 4 Drawing Sheets

REAL-TIME TRAFFIC FLOW INDICATOR DEVICE WITH ADVANCED SENSORS AND V2V COMMUNICATION

BACKGROUND

The present invention relates to the field of intelligent traffic management and road safety systems. More specifically, the invention pertains to a Real-Time Traffic Flow Indicator device that utilizes advanced sensor technology, real-time data processing, and vehicle-to-vehicle (V2V) communication to provide drivers with detailed, lane-specific traffic information.

Traffic congestion has become a significant problem in many cities worldwide due to increasing urbanization and population growth. Congested roads lead to delays, increased stress for drivers, higher fuel consumption, and elevated levels of air pollution. Road safety is also a major concern, with accidents frequently occurring due to sudden lane changes, lack of real-time traffic information, and unexpected road events.

Existing traffic monitoring systems and navigation tools often provide only generalized information about traffic conditions along a given route. They lack the ability to offer real-time, lane-specific data that would enable drivers to make informed decisions regarding lane changes and speed adjustments. As advancements in sensor technology progress and the development of smart cities continues, there is an increasing demand for intelligent traffic management solutions that can provide more detailed and actionable traffic insights.

Several prior systems have attempted to address these challenges in traffic management and driver information systems. For example, U.S. Patent No. 2005/0238425 to Safar et al. discloses a pavement marker and system for freeway advance accident merge signal and U.S. Patent Application Pub. No. 2017/0124869 to Popple et al. describes a traffic control system that enables communication between traffic control units, traffic signals, and vehicles.

These prior systems have limitations, while they provide some traffic information, they do not offer the comprehensive, real-time, lane-specific traffic analysis and communication capabilities of the present invention. The Real-time Traffic Flow Indicator Device goes beyond simple traffic signal status or basic vehicle-to-vehicle (V2V) communication by integrating advanced sensor fusion, edge-based lane detection algorithms, and a dynamic data processing architecture. These feature allow it to provide a more detailed and actionable assessment of traffic conditions to drivers.

Additionally, the present invention includes novel features not found in the prior art, such as the wireless communication and firmware update module that leverages Long-Range Low-Power (LoRa) communication. This enables efficient over-the-air updates of traffic data and algorithm improvements. The invention also seamlessly integrates with autonomous vehicle systems via standard protocols like Controller Area Network (CAN), enhancing interoperability across vehicle makes and models.

SUMMARY

The present invention is a Real-Time Traffic Flow Indicator device that provides drivers with comprehensive, lane-specific traffic information in real-time. The device integrates advanced sensor technology, edge-based data processing algorithms, and V2V communication to deliver a detailed assessment of traffic conditions, enabling drivers to make informed decisions regarding lane changes, speed adjustments, and navigation.

At the core of the device is an advanced sensor assembly comprising Time-of-Flight optical cameras, LIDAR, and Frequency Modulated Continuous Wave (FMCW) radar systems. These sensors continuously capture data about the vehicle's surroundings, including lane markings, vehicle positions, speeds, and distances. The captured data is processed by edge-based lane detection algorithms that employ Convolutional Neural Networks (CNNs) to accurately identify and track lane boundaries.

Real-time traffic analysis algorithms utilize sensor fusion techniques to integrate data from the advanced sensor assembly and the detected lane boundaries, providing a comprehensive assessment of the traffic environment. The analyzed data is represented through color-coded light indicators on a rear window display and a front windshield display, which use multiplexed pulse width modulation (PWM) control to depict specific traffic scenarios.

The device incorporates a V2V communication module that employs short-range wireless protocols for bidirectional transmission of lane-specific traffic information. A data fusion module equipped with Digital Signal Processors (DSPs) integrates sensor data with V2V communication, enabling comprehensive traffic analysis.

An Intelligent Data Processing Algorithm processes the integrated data to assess traffic conditions, including speed and traffic density, in real-time. The real-time traffic assessments and potential hazards are communicated to the driver through a high-resolution Liquid Crystal Display (LCD) interface and a safety alert subsystem that utilizes Field-Programmable Gate Arrays (FPGAs) for rapid processing and immediate feedback.

The device also features an emergency vehicle detection and indicator system that employs machine vision algorithms to detect emergency vehicles within the vehicle's vicinity and activate specific LED indicators to alert the driver.

Additional features of the Real-Time Traffic Flow Indicator device include a wireless communication module for firmware updates and traffic data reception via LoRa communication, an integrated power management system, and adaptive interfaces and connectors compliant with standard protocols like Controller Area Network (CAN) and SAE J1939 for seamless integration with various vehicle models and autonomous or semi-autonomous driving systems.

In summary, the Real-Time Traffic Flow Indicator device represents a significant advancement in intelligent traffic management and road safety systems. By combining cutting-edge sensor technology, advanced data processing algorithms, and robust V2V communication capabilities, the device provides drivers with real-time, lane-specific traffic information, ultimately enhancing driver awareness, safety, and the overall driving experience.

Additional features and advantages of the invention will be set forth in the description which follows, and in part will be obvious from the description, or may be learned by the practice of the invention. These and other features of the present invention will become more fully apparent from the following description, or may be learned by the practice of the invention as set forth hereinafter.

BRIEF DESCRIPTION OF THE DRAWINGS

The various exemplary embodiments of the present invention. which will become more apparent as the description proceeds, are described in the following detailed description in conjunction with the accompanying drawings, in which.

DETAILED DESCRIPTION

In the following detailed description of the preferred embodiments, reference is made to the accompanying drawings, which form a part hereof and show, by way of illustration, specific embodiments in which the invention may be practiced. It is to be understood that other embodiments may be used and structural or logical changes may be made without departing from the scope of the present invention. The following detailed description, therefore, is not to be taken in a limiting sense, and the scope of the present invention is defined by the appended claims.

The following description is provided as an enabling teaching of the present systems, and/or methods in its best, currently known aspect. To this end, those skilled in the relevant art will recognize and appreciate that many changes can be made to the various aspects of the present systems described herein, while still obtaining the beneficial results of the present disclosure. It will also be apparent that some of the desired benefits of the present disclosure can be obtained by selecting some of the features of the present disclosure without utilizing other features.

Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

The terms "a" and "an" and "the" and similar references used in the context of describing a particular embodiment of the present invention (especially in the context of certain claims) are construed to cover both the singular and the plural. The recitation of ranges of values herein is merely intended to serve as a shorthand method of referring individually to each separate value falling within the range. Unless otherwise indicated herein. each individual value is incorporated into the specification as if it were individually recited herein.

All systems described herein can be performed in any suitable order unless otherwise indicated herein or otherwise clearly contradicted by context. The use of any and all examples, or exemplary language (for example, "such as") provided with respect to certain embodiments herein is intended merely to better illuminate the application and does not pose a limitation on the scope of the application otherwise claimed. No language in the specification should be construed as indicating any non-claimed element essential to the practice of the application. Thus, for example, reference to "an element" can include two or more such elements unless the context indicates otherwise.

As used herein, the terms "optional" or "optionally" mean that the subsequently described event or circumstance can or cannot occur, and that the description includes instances where said event or circumstance occurs and instances where it does not.

The word or as used herein means any one member of a particular list and also includes any combination of members of that list. Further, one should note that conditional language, such as, among others, "can," "could," "might." or "may." unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Figure 1:
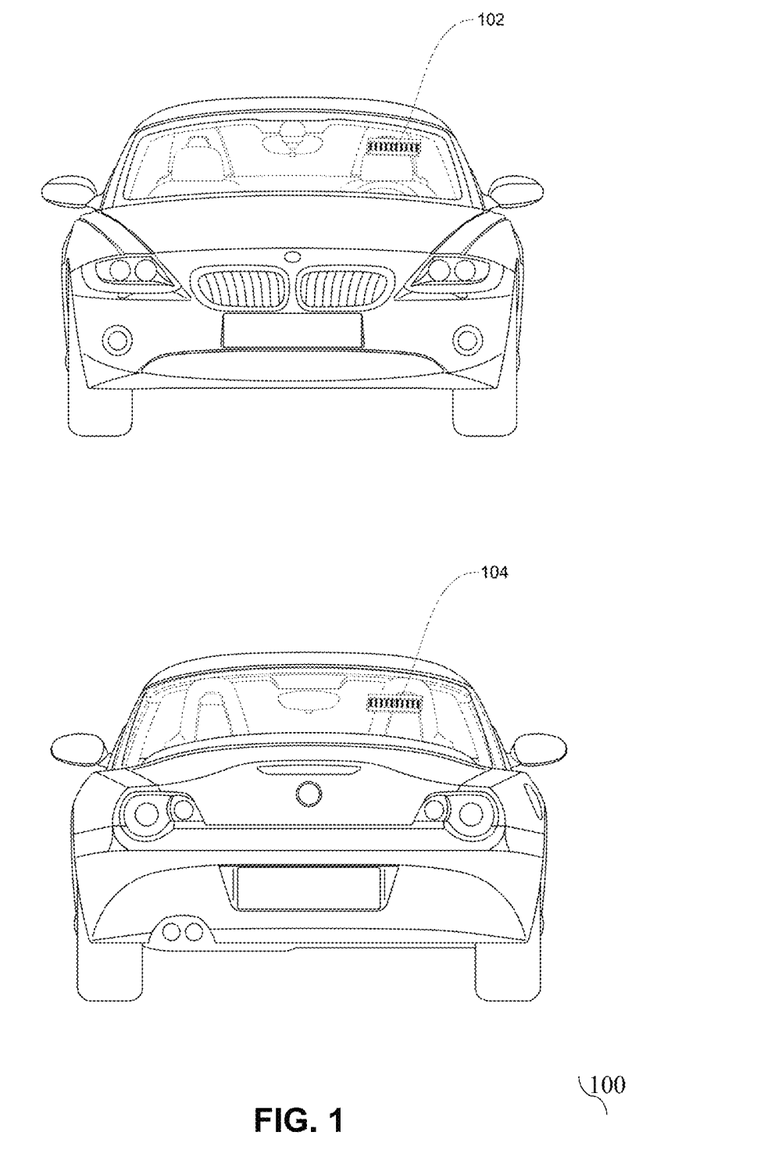
FIG. 1 illustrates an embodiment of the present invention wherein the front and rear windshield display modules incorporate a microcontroller-controlled LED array.

FIG. 1 illustrates an embodiment 100 of the present invention wherein the front windshield display module 102 incorporates a microcontroller-controlled LED array configured to present traffic information up to one mile ahead within the vehicle's lane. The LED array, utilizing multiplexed PWM control, displays color-coded information to represent different traffic scenarios such as heavy traffic (red), moderate traffic (orange), normal traffic flow (green), slow-moving traffic (yellow), and the presence of an emergency vehicle (blue). The front windshield display 102 module receives data from the advanced sensor assembly, which includes Time-of-Flight optical cameras, LIDAR, and FMCW radar systems. These sensors are strategically positioned to capture accurate information about lane boundaries and continuous traffic flow. The captured data is processed by edge-based lane detection algorithms employing CNNs to precisely identify and track lane boundaries. By presenting real-time, lane-specific traffic information directly on the front windshield, the module enhances driver awareness and proactively alerts the driver to changing traffic conditions up to one mile ahead, contributing to improved road safety and traffic management.

The rear window display module 104, equipped with a matrix of high-luminance Light Emitting Diode (LED) indicators, is designed to enhance the driver's situational awareness by providing real-time traffic information for both the vehicle's lane and adjacent lanes. The LED indicators, controlled by PWM, use color-coded lights to represent distinct traffic scenarios: red for heavy traffic, orange for moderate traffic, green for normal traffic flow, yellow for slow-moving traffic, and blue for the presence of an emergency vehicle in the lane. The rear window display module 104 receives information from the advanced sensor assembly, which includes Time-of-Flight optical cameras, LIDAR, LORA communication, and FMCW radar systems. This real-time data allows the LED indicators to dynamically update and accurately represent the traffic conditions in the vehicle's lane and nearby lanes, enabling the driver to make informed decisions while navigating. Additionally, the rear window display 104 features a dynamic arrow indicating the optimal lane for the vehicle to merge into based on the real-time traffic analysis, further enhancing the driver's decision-making process.

Figure 2:
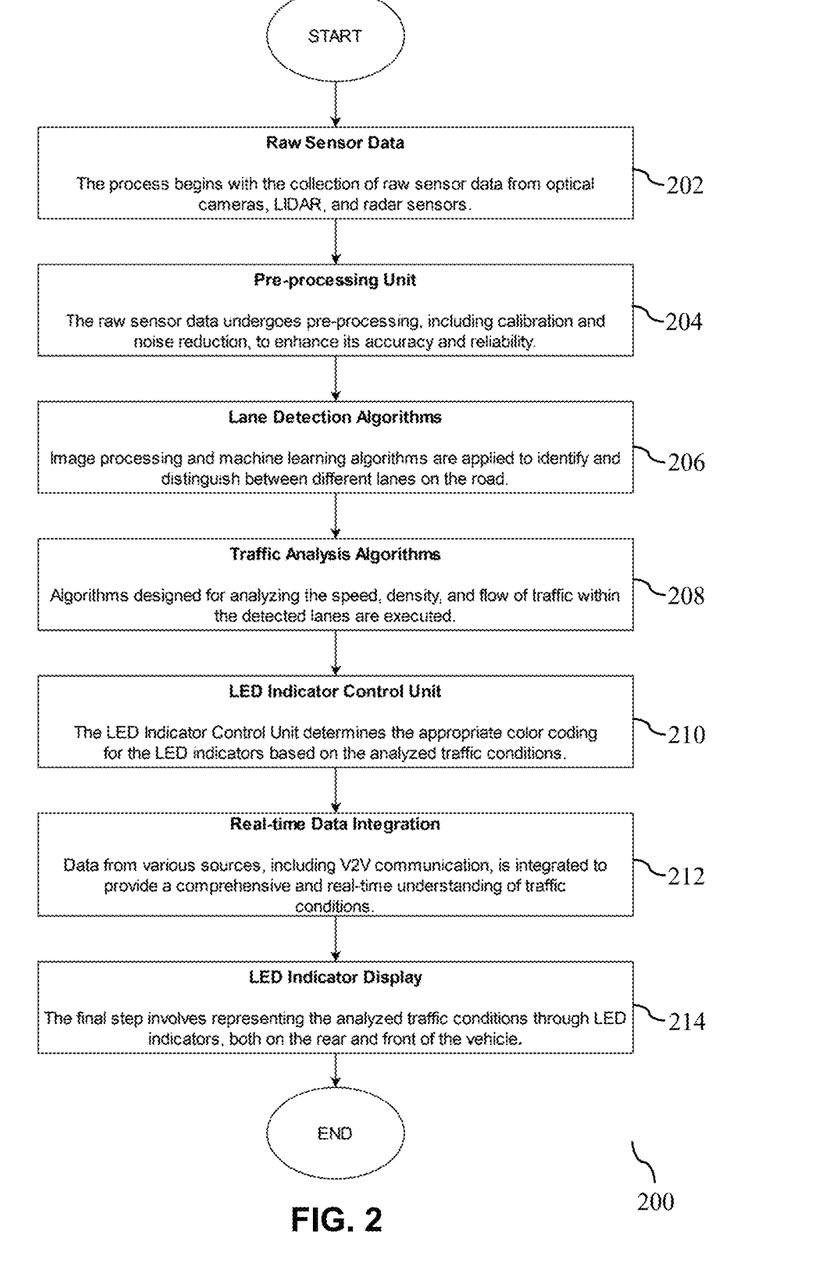
FIG. 2 depicts an embodiment of the present invention, wherein the Real-Time Traffic Flow Indicator Device provides drivers with accurate and timely information about the traffic conditions.

FIG. 2 depicts an embodiment 200 of the present invention wherein the Real-Time Traffic Flow Indicator Device combines various components and algorithms to provide drivers with accurate and timely information about the traffic conditions. The device's operation begins at step 202 with the continuous acquisition of data from the advanced sensor assembly, including Time-of-Flight optical cameras, LIDAR, and FMCW radar systems. Edge-based lane detection algorithms employing CNNs process data from Time-of-Flight optical cameras at step 204 to precisely identify and track lane boundaries by analyzing images to recognize patterns associated with lane markings, extracting important features to establish accurate lane boundaries at step 206. Sensor fusion techniques integrate data from LIDAR and FMCW radar systems with results from lane detection algorithms at step 208, creating a comprehensive dataset that includes vehicle densities, positions, speeds, and distances.

The Intelligent Data Processing Algorithm, which includes a recurrent neural network (RNN) for temporal traffic pattern analysis and a reinforcement learning model for adaptive traffic scenario classification, evaluates the comprehensive dataset in real-time. It maps specific traffic conditions to corresponding colors at step 210 based on PWM control. The algorithm facilitates bidirectional transmission of lane-specific traffic information between vehicles using the V2V communication module, which employs short-range wireless protocols for enhanced inter-vehicle communication.

DSPs in the data fusion module integrate sensor data with V2V communication at step 212, combining information from the sensor assembly, Micro-Electro-Mechanical Systems (MEMS) sensors, and neighboring vehicles to perform comprehensive and nuanced traffic analysis. The processed traffic information is presented to the driver through a Liquid Crystal Display (LCD) display and through the LED indicators at step 214, while the safety alert subsystem, powered by FPGAs, generates immediate alerts about changing traffic conditions and potential hazards.

The emergency vehicle detection and indicator system employs machine vision algorithms to identify emergency vehicles within the vehicle's vicinity. It utilizes a deep learning object detection model, such as YOLO (You Only Look Once) or SSD (Single Shot MultiBox Detector), to identify specific types of emergency vehicles. A priority-based LED activation scheme is used to indicate the relative proximity and urgency of detected emergency vehicles, with distinct colors and blinking patterns corresponding to the emergency vehicle's distance and speed.

The device seamlessly integrates with various vehicle systems, including autonomous and semi-autonomous driving systems, through adaptive interfaces and connectors compliant with standard protocols like Controller Area Network (CAN) and SAE J1939. This ensures interoperability with different vehicle models and facilitates enhanced navigational capabilities by providing real-time traffic information and lane-specific alerts.

Figure 3:
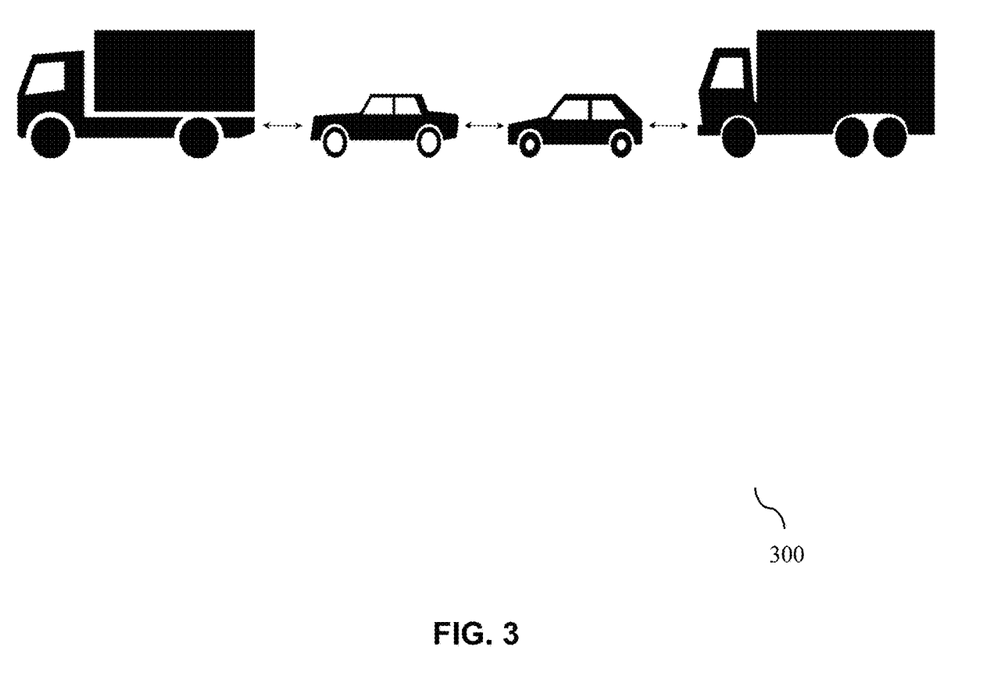
FIG. 3 illustrates an embodiment of the present invention disclosing a V2V communication module.

FIG. 3 illustrates an embodiment 300 of the present invention disclosing a V2V communication module as a key feature of the Real-Time Traffic Flow Indicator Device, enabling vehicles to share and receive lane-specific information with each other using short-range wireless protocols. This enhances the overall accuracy of traffic analysis and contributes to a more comprehensive understanding of the traffic environment.

The V2V communication module employs a dedicated short-range communication (DSRC) protocol for low-latency data transmission and a cellular vehicle-to-everything (C-V2X) protocol for long-range communication with infrastructure and other vehicles. Vehicles equipped with the Real-Time Traffic Flow Indicator Device share and receive real-time data about traffic conditions, speed, and other relevant details within a specific lane. The communication protocols are optimized to transmit and receive lane-specific data, contributing to a more accurate and detailed analysis. The data received through V2V communication is seamlessly integrated into the device's data fusion module, which employs DSPs for detailed traffic analysis. This integration ensures that the shared information directly influences the real-time traffic analysis and contributes to the accuracy of the color-coded light indicators on the rear window display and front windshield display. V2V communication allows for dynamic updates based on the changing traffic conditions, providing an adaptive and responsive approach to traffic analysis. It fosters a collaborative approach to traffic monitoring, where vehicles in a particular area effectively share their perspectives on traffic conditions, creating a networked system that contributes to the collective understanding of the traffic environment. The V2V communication module is designed to be compatible with autonomous and semi-autonomous driving systems, utilizing adaptive interfaces and connectors compliant with standard protocols like CAN and SAE J1939 for seamless integration.

In an embodiment of the present invention, the Real-Time Traffic Flow Indicator Device is equipped with a high-resolution LCD interface located within the vehicle. This interface is designed for easy accessibility by the driver and provides lane-specific information about the traffic conditions in the current lane and adjacent lanes, helping the driver make informed decisions. The LCD interface may include a visual representation of the color-coded light indicators' status, allowing the driver to quickly glance at the display and understand the current traffic conditions. The information displayed on the LCD interface is continuously updated in real-time as the device collects new data from the advanced sensor assembly and receives information through the V2V communication module. The LCD interface may offer customization options, allowing the driver to adjust settings such as sensitivity, brightness, or other preferences, ensuring a personalized user experience based on individual driving preferences. The LCD interface is seamlessly integrated with the vehicle's systems, providing a cohesive user experience and operating in conjunction with other safety features without causing distraction.

In an embodiment of the present invention, the Real-Time Traffic Flow Indicator Device includes a safety alert subsystem powered by FPGAs for rapid processing and immediate feedback on changing traffic conditions and potential hazards. The safety alert subsystem generates alerts to notify the driver of rapidly changing traffic conditions, such as a sudden increase in congestion or a potential hazard in the current lane. These alerts can be conveyed through visual cues on the LCD interface or through audible signals. Visual alerts may include flashing lights or specific icons on the display, while audible alerts could be tones or spoken messages. The device also features an emergency vehicle detection and indicator system that employs machine vision algorithms to detect emergency vehicles within the vehicle's vicinity. When an emergency vehicle is detected in the lane, the system activates specific LED indicators to alert the driver, signaling that there is an emergency ahead and prompting them to take appropriate actions. The safety alert subsystem is adaptive, responding to the real-time analysis of traffic conditions performed by the Intelligent Data Processing Algorithm, which utilizes Convolutional Neural Networks (CNN) for edge-based lane detection and sensor fusion techniques.

The installation and maintenance aspects of the Real-Time Traffic Flow Indicator Device are crucial considerations to ensure its effective functionality and longevity. The device is designed to be compact and aerodynamic, facilitating easy installation on the inside, left-hand side of the rear window of a car. Its streamlined design ensures minimal impact on the vehicle's aerodynamics. The device's design prioritizes durability, ensuring that it can withstand various environmental conditions and is constructed to be weather-resistant. The device has an integrated power management system configured to interface with the vehicle's Power Distribution Module (PDM) to optimize energy consumption. The power supply is reliable and provides continuous operation whenever the vehicle is running. The device is equipped with a wireless communication module for firmware updates and traffic data reception via LoRa communication. This feature enhances its accuracy and keeps the system up-to-date.

In an embodiment of the present invention, maintenance of the Real-Time Traffic Flow Indicator Device involves regular firmware updates to ensure the latest improvements in processing algorithms and overall system efficiency. These updates can be wirelessly delivered to the device via the wireless communication module using LoRa communication. Extensive testing is required during installation to calibrate the advanced sensor assembly, which includes Time-of-Flight optical cameras, LIDAR, and FMCW radar systems. Regular checks and calibration maintenance ensure that the sensors continue to provide precise data for lane detection and traffic analysis.

The edge-based lane detection algorithms employ CNNs, and may further utilize a MLP for feature extraction and a SVM for lane boundary classification. Routine checks of the rear window display and front windshield display are conducted to verify that each light indicator is functioning correctly and accurately representing the analyzed traffic conditions. The real-time traffic analysis algorithms integrate data from the advanced sensor assembly and the detected lane boundaries to assess vehicle positions, speeds, and overall traffic density. These algorithms may further employ a Kalman filler for sensor data fusion and noise reduction, and a HMM for traffic pattern recognition. As vehicles evolve and receive software updates, the device's compatibility with different car models and their systems is maintained through periodic checks and adjustments, ensuring seamless integration with various vehicle models and autonomous or semi-autonomous driving systems.

Figure 4:
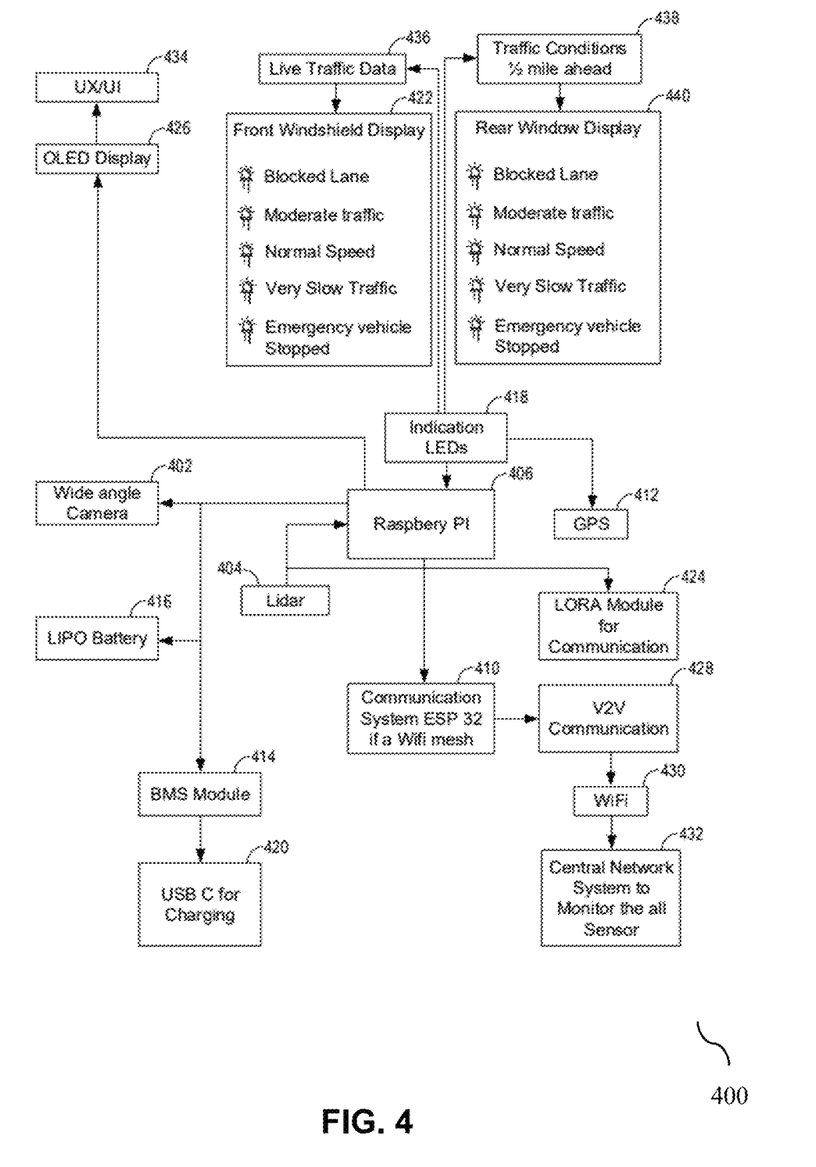
FIG. 4 depicts the integration of various components and technologies to achieve real-time, lane-specific traffic flow indication.

FIG. 4 illustrates an embodiment 400 of the present invention, depicting the integration of various components and technologies to achieve real-time, lane-specific traffic flow indication. The Real-Time Traffic Flow Indicator Device comprises an advanced sensor assembly, including Time-of-Flight optical cameras, LIDAR, and FMCW radar systems, configured to capture data about the vehicle's surroundings, such as lane markings, vehicle positions, speeds, and distances. A Raspberry Pi 406 serves as the central processing unit, providing the computational power needed to run complex algorithms for lane detection, traffic analysis, and LED 408 control. The device integrates a LIDAR sensor 404 to accurately measure distances to objects, detect lane boundaries, and determine the positions and speeds of surrounding vehicles. An ESP32 module 410 provides wireless communication capabilities, facilitating V2V communication using short-range wireless protocols, allowing the device to exchange traffic information with nearby vehicles. A GPS module 412 is implemented to track the vehicle's location accurately, providing real-time updates and enhancing the precision of traffic information. A Battery Management System (BMS) 414 module monitors and manages the LiPo battery 416 to ensure safe and efficient use, preventing overcharging or discharging. A wide-angle, high-resolution camera 402 captures real-time images of the road, focusing on lane markings, and provides visual data for the image recognition algorithms. The device includes a buzzer for generating audible alerts (not shown), which can be programmed to produce different sounds for safety alerts, lane change notifications, or emergency vehicle presence. A set of high-brightness LEDs 418, with different colors (Red, Orange, Green, Yellow, and Blue), serve as indicators for traffic conditions and emergency vehicle presence. The device is powered by a compact and lightweight LiPo battery 416, suitable for in-vehicle applications, and includes a USB C port 420 for convenient charging, ensuring compatibility with modern charging standards. A OLED Display 426 is connected to the Raspery Pi 406 via the HDMI port to display system information to the user.

In some embodiments, each LED is connected to a GPIO (General Purpose Input/Output) pin on the Raspberry Pi microcontroller. The GPIO pins control the illumination of the LEDs using PWM control. Each LED color (red, orange, green, yellow, and blue) is associated with a specific GPIO pin, and appropriate current-limiting resistors are used in series with each LED to prevent excessive current flow and protect the LEDs 418. The buzzer is connected to a GPIO pin on the microcontroller, with one wire connecting to the GPIO pin and the other to a ground (GND) pin. The high-resolution camera 402 is connected to the CSI (Camera Serial Interface) port on the Raspberry Pi 406 using a ribbon cable. The LIDAR sensor 404 has three wires for basic connections: power (VCC), GND, and serial communication (TX and RX). The power (VCC) wire is connected to a 5V power source on the Raspberry Pi 406, the GND wire is connected to a GND pin, and the TX and RX pins are connected to GPIO pins configured for serial communication. The serial interface is configured using the raspi-config tool, and necessary libraries or drivers are installed for the specific LIDAR sensor model. The ESP32 module 410 is connected to the Raspberry Pi, with the TXD pin of the ESP32 connected to the RXD pin, the RXD pin of the ESP32 to the TXD pin, and the GND pin of the ESP32 to the GND pin of the Raspberry Pi.

The Real-Time Traffic Flow Indicator Device offers several advantages that contribute to improved road safety, traffic flow, and driver decision-making:

1. Real-Time Traffic Information: The device provides real-time, lane-specific traffic information to drivers, allowing them to make informed decisions based on the current conditions of their specific lane.

2. Lane-Specific Data: Unlike traditional traffic monitoring systems, the device offers lane-specific information, allowing drivers to assess the speed and density of traffic in their current lane and adjacent lanes.

3. Enhanced Safety Alerts: The system includes safety alerts to notify drivers of rapidly changing lane conditions or the presence of emergency vehicles, promoting safer driving practices and helping drivers react promptly to potential hazards.

4. User-Friendly Interface: The LED light indicators use a simple color-coded system (Red, Orange, Green, Yellow) that is easy for drivers to interpret at a glance. The high-resolution LCD interface provides additional information and alerts.

5. V2V Communication: The device is equipped with V2V communication capabilities, allowing it to share and receive lane-specific traffic information with nearby vehicles, enhancing the overall effectiveness of traffic information dissemination.

6. Improved Traffic Flow: By guiding drivers to less congested lanes, the device contributes to improved traffic flow and reduced congestion, leading to smoother and more efficient transportation on highways.

7. Immediate Lane Change Decisions: The real-time feedback system, including the rear window display with a dynamic arrow indicating the optimal lane for merging and the front windshield display projecting a color-coded lane map, allows drivers approaching from the rear to see the current traffic condition of each lane well in advance, helping them make quick and informed decisions about lane changes.

8. Adaptable to Autonomous Driving Systems: The integration of V2V communication and sensor-based technology makes the device potentially compatible with autonomous or semi-autonomous driving systems, enhancing their capabilities by providing critical traffic information.

9. Compliance with Regulations: The design of the device is intended to comply with road safety and vehicle regulations. The LED lights are visible but not distracting, and the system is engineered to avoid interference with other vehicle functions.

10. Cost-Effective and Accessible: The device is designed to be cost-effective to produce and affordable for consumers, with different models offering varying levels of functionality to meet different user needs.

11. Easy Installation and Maintenance: The design allows for easy installation on a variety of car models, and routine maintenance involves firmware updates and sensor calibration checks.

12. Real-Time Updates and Accuracy: By continuously integrating data from the advanced sensor assembly, including MEMS sensors, and V2V communication using the data fusion module equipped with DSPs, the device offers real-time updates and accurate traffic conditions, ensuring that drivers receive the most current and relevant information.

The embodiments described herein are given for the purpose of facilitating the understanding of the present invention and are not intended to limit the interpretation of the present invention. The respective elements and their arrangements, materials, conditions, shapes, sizes, or the like of the embodiment are not limited to the illustrated examples but may be appropriately changed. Further, the constituents described in the embodiment may be partially replaced or combined together.

What is claimed is:

1. A method for providing real-time traffic flow indication in a vehicle, the method comprising:
    capturing, by an advanced sensor assembly comprising Time-of-Flight optical cameras, LIDAR, and FMCW radar systems, data about the vehicle's surroundings, including lane markings, vehicle positions, speeds, and distances;
    detecting, by edge-based lane detection algorithms employing CNNs, lane boundaries based on the captured data;
    analyzing, by real-time traffic analysis algorithms utilizing sensor fusion techniques, the traffic environment by integrating data from the advanced sensor assembly and the detected lane boundaries to assess vehicle positions, speeds, and overall traffic density;
    representing, by color-coded light indicators on a rear window display and a front windshield display using PWM control, specific traffic scenarios based on the real-time traffic analysis;
    communicating, by a V2V communication module using short-range wireless protocols, bidirectional transmission of lane-specific traffic information;
    integrating, by a data fusion module equipped with DSPs, sensor data with V2V communication for comprehensive traffic analysis;
    processing, by an Intelligent Data Processing Algorithm, the integrated data to assess traffic conditions, including speed and traffic density, in real-time;
    communicating, by a high-resolution LCD interface and a safety alert subsystem utilizing FPGAs the real-time traffic assessments and potential hazards to the driver; and
    detecting, by an emergency vehicle detection and indicator system using machine vision algorithms, emergency vehicles within the vehicle's vicinity and activating specific LED indicators to alert the driver.

2. The method of claim 1, wherein the advanced sensor assembly further comprises:
    a plurality of ultrasonic sensors for short-range object detection; and
    a high-resolution camera for capturing visual data of the vehicle's surroundings.

3. The method of claim 1, wherein the edge-based lane detection algorithms further employ:
    a MLP for feature extraction; and
    a SVM for lane boundary classification.

4. The method of claim 1, wherein the real-time traffic analysis algorithms further utilize:
    a Kalman filter for sensor data fusion and noise reduction; and
    a HMM for traffic pattern recognition.

5. The method of claim 1, wherein representing the specific traffic scenarios further comprises:
    displaying, by the rear window display, a dynamic arrow indicating the optimal lane for the vehicle to merge into based on the real-time traffic analysis; and
    projecting, by the front windshield display, a color-coded lane map indicating traffic conditions up to two miles ahead.

6. The method of claim 1, wherein the V2V communication module further employs:
    a DSRC protocol for low-latency data transmission; and
    a C-V2X protocol for long-range communication with infrastructure and other vehicles.

7. The method of claim 1, wherein the data fusion module further incorporates:
    a multi-sensor data association algorithm for correlating data from multiple sensors; and
    a particle filter for estimating the vehicle's state and surrounding traffic dynamics.

8. The method of claim 1, wherein the Intelligent Data Processing Algorithm further employs:
    a RNN for temporal traffic pattern analysis; and
    a reinforcement learning model for adaptive traffic scenario classification.

9. The method of claim 1, wherein the safety alert subsystem further comprises:
    a haptic feedback module for providing tactile alerts to the driver; and
    an auditory warning system for generating spoken alerts in critical situations.

10. The method of claim 1, wherein the emergency vehicle detection and indicator system further utilizes:
    a deep learning object detection model for identifying emergency vehicle types; and a priority-based LED activation scheme for indicating the relative proximity and urgency of detected emergency vehicles.

11. A Real-Time Traffic Flow Indicator Device for vehicular use, comprising:
- an advanced sensor assembly comprising Time-of-Flight optical cameras, LIDAR, and FMCW radar systems configured to capture data about the vehicle's surroundings, including lane markings, vehicle positions, speeds, and distances;
- a rear window display equipped with a matrix of light indicators capable of depicting real-time traffic conditions;
- a front windshield display containing a microcontroller-controlled LED array configured to present traffic information ahead within the vehicle's lane;
- a V2V communication module using short-range wireless communication protocols for enhanced inter-vehicle communication;
- a wireless communication module for firmware updates and traffic data reception via LoRa communication;
- an integrated power management system configured to interface with the vehicle's PDM to optimize energy consumption;
- an Intelligent Data Processing Algorithm utilizing CNNs for edge-based lane detection and sensor fusion techniques for real-time traffic analysis;
- a high-resolution LCD configured to present lane-specific traffic conditions;
- a safety alert subsystem powered by FPGAs for rapid processing and immediate feedback on changing traffic conditions and potential hazards;
- a data fusion module integrating data from MEMs sensors and V2V communication, employing DSPs for detailed traffic analysis;
- an emergency vehicle detection and indicator system employing machine vision algorithms to detect emergency vehicles and activate specific LED signals to alert the driver; and
- adaptive interfaces and connectors compliant with standard protocols comprising CAN and SAE J1939 for seamless integration with various vehicle models and autonomous or semi-autonomous driving systems.

12. The Real-Time Traffic Flow Indicator Device of claim 11, wherein the advanced sensor assembly further comprises a plurality of ultrasonic sensors for short-range object detection and a high-resolution camera for capturing visual data of the vehicle's surroundings.

13. The Real-Time Traffic Flow Indicator Device of claim 11, wherein the Intelligent Data Processing Algorithm further employs edge-based lane detection algorithms comprising a MLP for feature extraction and a SVM for lane boundary classification.

14. The Real-Time Traffic Flow Indicator Device of claim 11, wherein the Intelligent Data Processing Algorithm further utilizes real-time traffic analysis algorithms comprising a Kalman filter for sensor data fusion and noise reduction and a HMM for traffic pattern recognition.

15. The Real-Time Traffic Flow Indicator Device of claim 11, wherein the rear window display is further configured to display a dynamic arrow indicating the optimal lane for the vehicle to merge into based on the real-time traffic analysis, and the front windshield display is further configured to project a color-coded lane map indicating traffic conditions up to two miles ahead.

16. The Real-Time Traffic Flow Indicator Device of claim 11, wherein the V2V communication module further employs a DSRC protocol for low-latency data transmission and a cellular C-V2X protocol for long-range communication with infrastructure and other vehicles.

17. The Real-Time Traffic Flow Indicator Device of claim 11, wherein the data fusion module further incorporates a multi-sensor data association algorithm for correlating data from multiple sensors and a particle filter for estimating the vehicle's state and surrounding traffic dynamics.

18. The Real-Time Traffic Flow Indicator Device of claim 11, wherein the safety alert subsystem further comprises a haptic feedback module for providing tactile alerts to the driver and an auditory warning system for generating spoken alerts in critical situations.

19. The Real-Time Traffic Flow Indicator Device of claim 11, wherein the emergency vehicle detection and indicator system further utilizes a deep learning object detection model for identifying emergency vehicle types and a priority-based LED activation scheme for indicating the relative proximity and urgency of detected emergency vehicles.

* * * * *